Feb. 3, 1970  G. W. JONES  3,493,692
APPARATUS FOR ISSUING INFORMATION SIGNALS
Filed July 6, 1966  2 Sheets-Sheet 1

GEORGE WILLIAM JONES,
Inventor

By Wenderoth, Lind and Ponack
Attorneys

Feb. 3, 1970 G. W. JONES 3,493,692
APPARATUS FOR ISSUING INFORMATION SIGNALS
Filed July 6, 1966 2 Sheets-Sheet 2
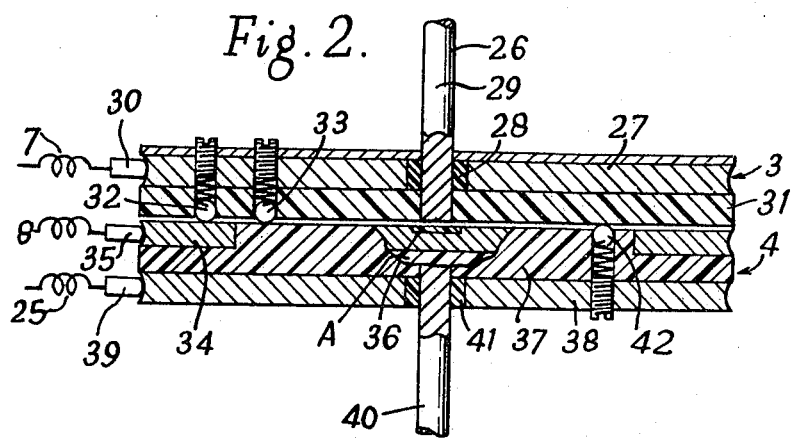
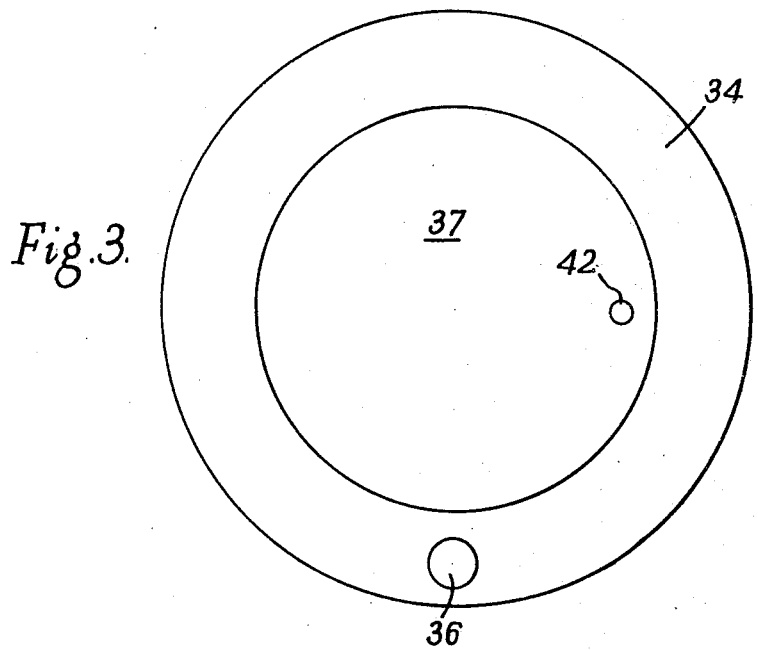
GEORGE WILLIAM JONES
Inventor

United States Patent Office 3,493,692
Patented Feb. 3, 1970

3,493,692
APPARATUS FOR ISSUING INFORMATION SIGNALS
George William Jones, Cranfield, Bedford, England, assignor to Ripper Robots Limited, London, England
Filed July 6, 1966, Ser. No. 563,148
Claims priority, application Great Britain, July 10, 1965, 29,364/65
Int. Cl. G11b 31/00
U.S. Cl. 179—100.1                    19 Claims

ABSTRACT OF THE DISCLOSURE

Apparatus for issuing information signals at predetermined reference points in the passage of a varying parameter. A play-back device is provided including scanning means for scanning and playing back a record programmed to include command signals of lengths proportional to the distances, in terms of the parameter, between respective adjacent reference points. A differential switch has a first part, and first driving means is coupled to said first part of said differential switch and responsive to the passage of the varying parameter to drive the first part in synchronism therewith. The differential switch has a second part with respect to which the first part is movable, and switch contacts are carried respectively by the first and second parts of the switch which are effective to operate only when the two parts are in a unique relative position of registration. Coupling means couple the switch contacts to the scanning means for initiating scanning of the record when the contacts are operated. Further drive means is coupled to the play-back device and the differential switch and activated in response to a command signal to move the first and second parts of the differential switch apart a distance proportional to the length of the command signal, the sense of this relative movement being opposite to the sense of the relative movement caused by the driving of the first part in synchronism with the varying parameter, the two switch parts being thereby brought back to registration at each reference point by the first driving means. The play-back device includes play-back means for playing back any information signals during each scan.

---

The invention relates to apparatus for issuing information signals at predetermined reference points in the passage of a varying parameter.

According to the invention such apparatus comprises a play-back device for playing back a record programmed to include command signals of lengths proportional to the distances, in terms of the parameter, between respective adjacent reference points and a differential switch having a first part driven in synchronism with said varying parameter, a second part and switch contacts which operate to make or break a circuit only when the two parts are in a unique relative position of registration, the arrangement being such that at each reference point the first part of the differential switch is brought to the registration position with respect to the second part, the switch contacts thereby operate to initiate scanning of the record by the play-back device, the two parts of the differential switch are moved apart in response to the command signal scanned a distance proportional to the length thereof, the sense of this relative movement being opposite to the sense of the relative movement caused by the driving of the first part in synchronism with the varying parameter, and the scan is stopped, any information signals appropriate to the reference point being issued immediately before, after or during the command signal.

The first part of the switch may be movable relative to a frame therefor, which frame constitutes the second part of the switch. With this arrangement the varying parameter may be regarded as causing forward movement of the first part whereas the command signals cause backward movement of the first part relative to the frame.

However, in a preferred embodiment of the invention both said first and second parts of the switch are movable in the switch frame, the second part being driven in response to the command signals only whereas the first part is driven in response to the varying parameter only. The second part may be driven by an electric motor supplied from a voltage regulator or another kind of constant speed electric motor, such as a mechanically governed motor or a synchronous motor.

It is to be understood that the command signals may take the form of pulse trains, in which case the length of each command signal is conveniently represented by the number of pulses, this being determined by a pulse counting mechanism, such as a stepping switch, for example.

The invention has many applications and the varying parameter can take many forms. In a preferred embodiment of the invention the apparatus is for use in a road vehicle and issues prerecorded information in spoken form regarding directional instructions, delivery instructions or information of general interest at and pertinent to particular reference points along a pre-planned route. In such an arrangement the varying parameter is the distance covered by the vehicle, as represented by an input to the differential switch derived preferably from the vehicle odometer. It is convenient, but not necessary, for the information to be issued in spoken form. Alternatively the information can be conveyed in a visual presentation by suitable control of moving signs, lights etc.

Other examples of the use of the invention in which distance is the varying parameter are in the provision of navigational facilities for boats, ships and aircraft. The instructions need not be in spoken form but may be appropriate control signals for an auto-navigator, for example. Even in railway systems, where there is little need for navigational instructions, except perhaps in terms of special shunting or other specific maneuvering functions. particular application for the invention is found in the provision of spoken instructions and advice to passengers appropriate to the different stations.

In these applications the invention is useful not only in connection with unknown routes but also over known routes in conditions of fog or darkness.

The apparatus may be used in the control of automatic process systems. For example, if a machine tool is to be controlled to perform various functions at appropriate places on a work-piece, the apparatus according to the invention can be used to issue the appropriate control signals, the varying parameter being the movement of the tool relative to the work-piece. Another form of process control which may be effected by the apparatus is the blending of substances in liquid, powder, dry material or gaseous form. In this case the varying parameter would be the flow of the appropriate substance, a flow-meter being coupled to move said first part of the differential switch, and the "distances" between reference points being regarded as the differences in terms of volume between predetermined volumes at which action is to be taken.

The varying parameter may be in time, a clock, for example a synchronous or other constant speed electric motor being coupled to move said first part of the differential switch. The apparatus used in this way has application in teaching machines in which the information signals are prerecorded questions and answers separated in their delivery by predetermined time intervals which may be different to suit the different questions. Similarly, the invention can be used in an automatic slide projection system in which slide changing signals and/or appropriate commentaries constitute the information signals which are issued at predetermined times. Another similar application is in the recital of spaced instructions regarding complex check-out procedures in the checking or testing of equipment in, for example, an aircraft systems check.

Preferably the apparatus includes recording means for making the record to be played back by the play-back means. In this way each user is able to prepare records to suit his own uses as well as being able to use records prepared elsewhere. In the preferred application to auto-navigation equipment, for example, a driver may prepare a record of route instructions in accordance with any proposed route, either from a map or en route. Such a provision is almost essential where specific delivery instructions are to be included in the record or for routes planned with other peculiarities. However, for routes of more general interest, for example, of the kind which are prepared by motoring organizations for their subscribers on request (at present in printed form) it is envisaged that the motoring organisations may prepare records for use in the apparatus.

Preferably the recording means, when provided, comprises a command signal generator, a recorder for making a record of the generator output and a manually operable switch, the arrangement being such that in making the record an actual variation or a simulated variation of said parameter may be allowed to drive the first part of the differential switch from the position of registration with the second part, which position corresponds to a reference point, a distance proportional to the distance to the next reference point, and the two parts of the differential switch may then be driven back relative to each other in response to the operation of said manually operable switch at constant speed until they are again in registration, the generator being activated and the output thereof recorded while the parts are being driven back.

Conveniently the command signals are in the form of a tone, the command signal generator being an oscillator giving the tone as its output and a tone sensitive circuit being provided for ensuring the maintenance of the scan and the movement of the second part of the differential switch for the direction of the command signal. Preferably the recorder and play-back device are constituted by a magnetic wire or tape recorder. Using the features of the invention the amount of wire or tape required for a given programme is a minimum since the recorder is switched on only at each reference point for the length of time required to issue the information and set the differential switch for the next reference point.

In a preferred form the differential switch is a rotary switch, said two parts comprising discs mounted coaxially face to face and being rotatable independently, and the pair of differential switch contacts comprises a brush on one disc and a conductive ring on the other disc with which the brush normally makes contact, the ring being broken at one point corresponding to the registration position, the arrangement being such that at all positions other than the registration position, at which contact is broken, the brush makes contact with the ring.

The invention will further be described with reference to the accompanying drawings, in which:

FIGURE 2 is a sectional elevation of the differential switch of the FIGURE 1 arrangement, and FIGURE 3 is a plan view of one of the parts of the differential switch.

Figure 1:
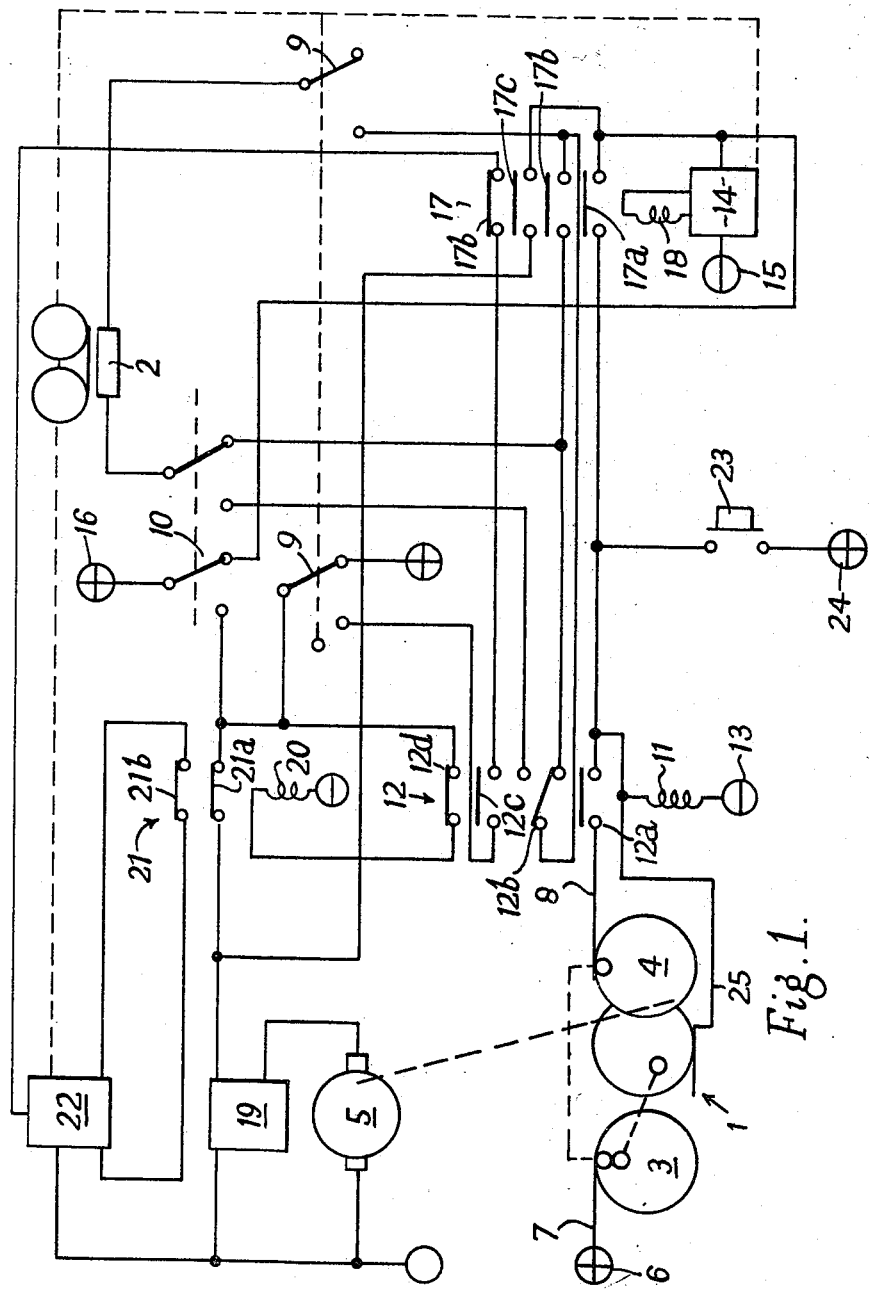
FIGURE 1 is a circuit diagram of apparatus according to the invention incorporating recording means for making the record.

The apparatus shown in the drawings is particularly suitable for use in connection with the issuing of directional instructions and other information in a road vehicle as it is being driven along a pre-planned route. This is the application to which reference will be made hereinafter.

The apparatus comprises a differential switch 1 and a tape recorder 2. The form of the differential switch will be described with reference to FIGURES 2 and 3 but for the purposes of the description with reference to FIGURE 1 it is sufficient to understand that the switch comprises two discs 3 and 4 mounted face to face on a common axis and movable independently of each other. Disc 3 is connected to be driven by the odometer drive of the vehicle and disc 4 by an electric motor 5. There is one relative position of the discs in which they are in registration and in this position only is a circuit path from a positive supply terminal 6 through a lead 7 and to a lead 8 broken. In all other relative positions of discs 3 and 4 this circuit path is closed.

The operation of the equipment will first be described with reference to its use in giving pre-recorded instructions (e.g. directional instructions—turn left, turn right, etc.) at appropriate places along the proposed route. At the start of the route which is regarded as the datum position the equipment is switched on by means of a double switch 9 which is shown in the "off" position and a double switch 10 is switched to the position shown which corresponds to "play-back." In a manner which will be described the differential switch part 4 will be rotated by motor 5 until the two discs are in registration and the circuit between leads 7 and 8 is broken. This has the effect of withdrawing energising current from the coil 11 of a relay 12, the other side of which coil is connected to a negative supply terminal 13. Relay 12 has four sets of contacts suffixed $a$ to $d$ respectively and when the relay is de-energised the contacts assume the conditions shown. Contacts 12b are arranged to switch on the recorder 2 which thereupon issues any pre-recorded instructions and then plays a recorded tone signal of approximately 1,000 c.p.s. which has a length directly proportional to the distance from the datum position to the first reference position on the route.

The recorded tone is received by a tone sensitive circuit 14 which receives its supply from a negative terminal 15 to which it is connected directly and from a positive terminal 16 to which it is connected through switch 10. Circuit 14 responds to the tone command signal which issues from the recorder 2 and energises a relay 17 which has an operating coil 18 and four contacts suffixed $a$ to $d$ respectively. On energisation of coil 18 the contacts of relay 17 assume the conditions opposite to those shown in the drawings. Thus an energising current is applied to the coil 11 of relay 12 through contacts 17a and this reverts the condition of the contacts of relay 12 to the opposite to those shown in the drawings. Contacts 17b are in parallel with contacts 12b and on closure ensure that the recorder 2 continues running. Contacts 17c close to energise a voltage regulator 19 which thereupon applies a regulated voltage to drive motor 5.

Motor 5 is linked to disc 4 of the differential switch and on being driven rotates disc 4 away from the position in which it registers with disc 3. As soon as disc 4 is moved from the registration position the circuit path between the leads 7 and 8 is made and energisation of relay coil 11 is ensured through contacts 12a. Relay 17 remains energised and continues to drive the motor 5 until the tone from the recorder ceases. On cessation of the tone the coil 18 is deprived of its energising current and the contacts of relay 17 revert to the positions shown in the figure. Motor 5 and disc 4 are stopped, as is the record 2. Since the length of the recorded tone was arranged to be directly proportional to the distance between the datum point and the first reference point of the route the angular distance which has been moved by disc 4 relative to disc 3 (and which is less than one revolution) is also directly proportional to this distance. The vehicle moves off and disc 3 is driven by the odometer in a direction to follow the movement of disc 4. When the appropriate distance has been moved by the vehicle the disc 3 comes into registration with disc 4 and the circuit path between leads 7 and 8 is broken. Thus, in the manner already described, the recorder is switched on, the appropriate instructions issued, and then the tone signal is played. The tone signal, which is now arranged to have a duration proportional to the distance between the first reference position and the second reference position on the route is applied to the tone responsive circuit 14 which rotates disc 4 the appropriate amount.

It will be appreciated that the accuracy of the apparatus is dependent upon the accuracy of the odometer of the vehicle. Factors such as the wear of tyres in addition to the inherent instrumental inaccuracy of vehicle odometers require the provision of means for compensating for errors in this respect. To this end there is provided the voltage regulator 19 which is adjustable in output by manual control. Adjustment of the output of the voltage regulator effects adjustment of the speed of motor 5, and therefore allows correlation to be made between the angular distance moved by disc 3 and that moved by disc 4 for a given nominal distance. It is a simple matter to arrange for a test tone of a length appropriate to say 1 mile to be applied to the beginning of the record so that the apparatus may be calibrated appropriately by adjustment of the voltage regulator by moving the disc 3 a distance appropriate to 1 mile on the odometer.

The apparatus shown in FIGURE 1 is suitable not only for using a record already made but also for making a record for future use. In making a record switch 9 is switched to the "on" position and switch 10 to the position opposite to that shown which corresponds to a "record" position. It will be seen that switch 10 thereby performs the function of isolating the tone responsive circuit 14 from the supply and instead making the supply available to the operating coil 20 of a further relay 21. With relay 12 de-energised contacts 12d are in the position shown and energising current is applied through coil 20. This has the effect of changing the condition of two sets of contacts 21a and 21b of relay 21 which then respectively isolate voltage regulator 19 and an oscillator 22.

At the datum position of the route it is ensured that discs 3 and 4 are in registration. Therefore the circuit path between leads 7 and 8 is broken and the contacts of relay 12 are in the condition shown. The vehicle is driven off along the route and the odometer drives disc 3 from the registration position. Since contacts 12a are open the making of the circuit path between leads 7 and 8 has no effect on relay 12. The vehicle is driven as far as the first reference point whereupon a zero button 23 is depressed manually to close a circuit between a positive supply terminal 24 and the negative supply terminal 13 through coil 11. This operates relay 12 so that contacts 12b switch on the recorder which is now connected thereto through switch 10 in the position opposite to that shown and contacts 12d open. The opening of contacts 12d has the effect of de-energising coil 20 and closing contacts 21a and 21b so that the voltage regulator 19 is energised and the oscillator 22 is conditioned to emit a tone signal. Therefore, motor 5 drives disc 4 in a direction to reduce the angle between discs 3 and 4 and during this time oscillator 22 emits a tone signal which is recorded on recorder 2. The time taken for disc 4 to reach registration with disc 3 is directly proportional to the distance covered by the vehicle since the datum position and the length of tone recorded on the record is also proportional to this distance. When disc 4 comes into registration with disc 3 the energising circuit for relay 12 is broken (button 23 having been released as soon as relay 12 was energised) and relay 12 is de-energised so that relay 21 is again energised and oscillator 22 is switched off and the power supply is removed from voltage regulator 19. The recorder is switched off by reversion of contact 12b to the position shown.

It is found convenient to make relay 21 a delayed action relay in respect of its de-energisation. In other words there is a delay between de-energisation of coil 20 and closing of contacts 21a and 21b. This ensures that there is a delay between the closing of the start switch for the recorder and the energisation of the motor 5 and oscillator 22. This allows time for the recorder to build up running speed before the tone is applied and before the disc 4 starts to move.

When the recorder has switched off automatically as described, the microphone (not shown) is actuated in the normal way to start the recorder, the instructions appropriate to the reference point are recorded and the recorder is switched off by the microphone control.

It is found that in practice there is a danger of cross coupling between the oscillator 22 and the tone responsive circuit 14 if they are applied with energising potential simultaneously. Such cross coupling can cause incorrect operation of the tone responsive relay 17. In order to prevent this it is ensured through switch 9 that energising potential for the tone circuit and the oscillator cannot be applied simultaneously to both and, in addition, the energising circuit for oscillator 22 includes a lead 25 in which are series contacts 12c and 17d. This ensures that the oscillator is not provided with energising potential unless relay 12 is energised and relay 17 de-energised.

In the event that the distance between adjacent reference points on the route is greater than the distance appropriate to a full revolution of disc 3 relative to disc 4 means are provided for recording automatically the passage of any intermediate revolutions. This takes the form of a further pair of contacts on differential switch which are arranged so that contact is made between a lead 25 and lead 7 when disc 3 has been rotated a distance from the registration which is approximately three-quarters of a revolution. This distance is short of a full revolution in order to allow for scaling errors for which adjustment by voltage regulator 19 is possible. Lead 25 is connected to coil 11 so that closure of the path between lead 25 and the positive terminal 6 has the same effect as pushing the manually operable zero button 23. Thus, if disc 3 is rotated for three-quarters of a revolution without a reference point having been reached the relay 12 is operated automatically and the recorder, oscillator, and motor are switched on and driven to bring the discs back into registration in the manner described above with reference to depression of manually operable button 23.

Reference to FIGURE 2 shows a sectional elevation of a differential switch of the kind referred to in FIGURE 1. The switch has two discs 3 and 4 independently rotatable about a common axis 26. Disc 3 is driven by the odometer drive and disc 4 by the motor 5 (FIGURE 1). Disc 3 comprises a slip ring 27 which is an annular slab of metal insulated by an insulating bushing 28 from its shaft 29. A brush 30 bears against the slip ring and makes contact with lead 7.

Adjacent slip ring 27 is a slab of insulating material 31 which carries two spring-loaded ball bearings 32 and 33. These ball bearings make contact through their springs with slip ring 27 and bear against disc 4. Disc 4 has an annular metal slip ring 34 which makes contact with a brush 35 connected to lead 8. Ball 32 makes electrical contact with slip ring 34 in all positions of relative rotation of disc 3 with disc 4 except one. At this one position the slip ring 34 is provided with an inset 36 of insulating material. For the sake of convenience the inset material 36 is shown in FIGURE 2 in a broken away portion A since the portion 36 is not on the section line taken for FIGURE 2.

Slip ring 34 is mounted in a block 37 of insulating material which has on its outer face another slip ring 38. A brush 39 makes contact with slip ring 38 and is connected to lead 25. Slip ring 38 is insulated from its shaft 40 by a bushing 41. A further spring-loaded ball bearing 42 is mounted in disc 4 to be urged against the face of disc 3 and is connected by its spring electrically to slip ring 38. The angular difference, in the sense of the angular rotation of disc 4 with respect to disc 3, between inset 36 and ball 42 is 270°. Ball 42 is on the same radius as ball 33 and these balls make contact when the discs have been rotated relatively three-quarters of a revolution from the registration position. As was described above with reference to FIGURE 1 this has the effect of duplicating the action of push button 23.

FIGURE 3 shows in plan view the face of disc 4 with the inset 36 in the slip ring 34 and the ball 42 in the block 37.

The invention is not restricted to the details of the foregoing description of one embodiment thereof. For example, in making a record from a map it is possible to provide for a simulated passage of distance by manual rotation of the disc normally driven from the odometer, the instrument being calibrated so that the disc may be manually rotated an angle equivalent to the required distance Conveniently said disc is normally coupled to the odometer drive through a spring loaded clutch or disengageable gear or the like. A hand knob or wheel is mounted on the face of the instrument where calibrations are provided to show its angular position in terms of equivalent road distance. Depression of the knob or wheel disengages the clutch or the like and rotation thereof turns the disc. Thus the record may be made with the vehicle stationary and even with the equipment removed from the vehicle. The same principle may of course, be applied whatever the parameter concerned.

In another embodiment a vehicle odometer of the kind having a train or related gears is arranged to constitute the differential switch, the gears being wound on by the tone signal and wound back by the progression of the vehicle. Switches associated with the gears effect the necessary relay control functions.

I claim:

1. Apparatus for issuing information signals at predetermined reference points in the passage of a varying parameter comprising a play-back device including scanning means for scanning and playing back a record programmed to include command signals of lengths proportional to the distances, in terms of the parameter, between respective adjacent reference points; a differential switch having a first part; first driving means coupled to said first part of said differential switch and responsive to the passage of the varying parameter to drive the first part in synchronism therewith; a second part of the differential switch with respect to which the first part is movable; switch contacts carried respectively by the first and second parts of the switch which are effective to operate only when the two parts are in a unique relative position of registration; coupling means coupling the switch contacts to the scanning means for initiating scanning of the record when the contacts are operated; further drive means coupled to the play-back device and the differential switch and activated in response to a command signal to move the first and second parts of the differential switch apart a distance proportional to the length of the command signal, the sense of this relative movement being opposite to the sense of the relative movement caused by the driving of the first part in synchronism with the varying parameter, the two switch parts being thereby brought back to registration at each reference point by the first driving means; and the play-back device including play-back means for playing back any information signals during each scan.

2. Apparatus as claimed in claim 1 wherein the further drive means comprises a tone-sensitive circuit responsive to command signals in the form of a tone to ensure the maintenance of the scan and the movement apart of the two parts of the differential switch for the duration of the command signal.

3. Apparatus as claimed in claim 1 further comprising recording means for making the record to be played back by the play-back device, the recording means comprising a command signal generator; a recorder coupled to the signal generator for making a record of the signal generator output; a manually operable switch; a drive unit coupled to the differential switch responsive to a variation of said parameter to drive the first part of the differential switch from the position of registration with the second part, which position corresponds to a reference point, a distance proportional to the distance to the next reference point; return means to which is coupled the manually operable switch and in turn coupled to the differential switch and responsive to said manually operable switch to drive the two parts of the differential switch back relative to each other at constant speed until they are again in registration; and means coupled to the signal generator for activating the generator and recording the output thereof while the parts are being driven back.

4. Apparatus as claimed in claim 3 wherein the differential switch has a second pair of contacts arranged to operate when the switch nears the limit of its differential movement, and has circuit connections for ensuring that under these circumstances while the record is being made the second pair of contacts performs the function of the manually operable switch.

5. Apparatus as claimed in claim 1 wherein the differential switch is a rotary switch, said two parts comprising discs mounted co-axially face to face.

6. Apparatus as claimed in claim 4 wherein the differential switch is a rotary switch, said two parts comprising discs mounted co-axially face to face and said second pair of differential switch contacts comprises two brushes, one mounted in one disc and the other mounted in the other disc, which brushes make contact with each other only when the discs have rotated relative to each other from the register position an angle which is a substantial part of 360°.

7. Apparatus as claimed in claim 5 wherein the two differential switch contacts comprise a brush on one disc and a conductive ring on the other disc with which the brush normally makes contact, the ring being broken at one point corresponding to the registration position, and at all positions other than the registration position, at which contact is broken, the brush makes contact with the ring.

8. Apparatus as claimed in claim 1 wherein the further drive means comprises an electric motor provided to drive the two switch parts relative to each other in response to the command signal, the motor deriving its supply from a voltage regulator.

9. Apparatus as claimed in claim 3 wherein the command signals are in the form of a tone, the command signal generator being an oscillator giving the tone as its output.

10. Apparatus as claimed in claim 3 wherein the record includes said information signals in spoken form.

11. Apparatus as claimed in claim 6 wherein the angle is substantially 270°.

12. Apparatus as claimed in claim 7 wherein the brush comprises a spring-loaded ball bearing.

13. Apparatus as claimed in claim 8 wherein the voltage regulator is adjustable to enable the effective speed of the motor to be adjusted in compensation for scaling errors in the translation of said parameter to movement of the first differential switch part.

14. Apparatus as claimed in claim 8 including a first relay connected to be energized through the differential switch contacts which make contact except at the registration position, a first pair of relay contacts belonging to the first relay and connected to start the record scan when the first relay is de-energized, a second relay connected to be energized in response to the presence of the command signal, a second pair of relay contacts belonging to the second relay connected to maintain the record scan while the second relay is energized, and a third pair of relay contacts belonging to the second relay and connected to energise the motor while the second relay is energised.

15. Apparatus as claimed in claim 14 wherein there is provided a fourth pair of relay contacts belonging to the first relay and connected in series with the differential switch contacts and arranged to open on de-energisation of the first relay and a fifth pair of relay contacts belonging to the second relay and connected to energise the first relay while the second relay is energised.

16. Apparatus as claimed in claim 15 adapted also to make the record, the play-back device being also a recorder, and comprising a sixth pair of relay contacts associated with the first relay and connected to energise the motor while the first relay is energised.

17. Apparatus as claimed in claim 16 wherein there is provided a command signal generator and a seventh pair of relay contacts associated with the first relay and connected to energise the command signal generator while the first relay is energised.

18. Apparatus as claimed in claimed 17 wherein the sixth and seventh pairs of relay contacts belong to a delayed-action relay being closed while the delayed-action relay is de-energised, there being provided an eighth pair of relay contacts belonging to the first relay and connected to de-energise the delayed-action relay while the first relay is energised.

19. Apparatus as claimed in claim 17 wherein there are provided switches connected to ensure that the command signal generator is isolated from its supply when the apparatus is being used for play-back and the circuit responsive to the command signal is isolated from its supply when the apparatus is being used for recording.

References Cited

UNITED STATES PATENTS

| | | | |
|---|---|---|---|
| 2,680,150 | 6/1954 | Weld | 179—100.2 |
| 2,782,626 | 2/1957 | Jochum | 179—100.2 |
| 2,905,769 | 9/1959 | Peterson. | |
| 2,928,898 | 3/1960 | Salzberg. | |
| 3,024,321 | 3/1962 | Davis. | |
| 3,193,626 | 7/1965 | Barney. | |

TERRELL W. FEARS, Primary Examiner

U.S. Cl. X.R.

179—100.2